United States Patent
Lee et al.

(10) Patent No.: US 9,216,545 B2
(45) Date of Patent: Dec. 22, 2015

(54) PRINTING HEAD MODULE

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Yang-Teh Lee, New Taipei (TW); Chien-Chih Chen, New Taipei (TW); Yi-Chin Tang, New Taipei (TW); Ying-Chi Hsu, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 0 days.

(21) Appl. No.: 14/225,456

(22) Filed: Mar. 26, 2014

(65) Prior Publication Data

US 2015/0190963 A1 Jul. 9, 2015

(30) Foreign Application Priority Data

Jan. 6, 2014 (TW) .............................. 103100420 A

(51) Int. Cl.
*B29C 67/00* (2006.01)
*B33Y 30/00* (2015.01)

(52) U.S. Cl.
CPC ............. *B29C 67/0059* (2013.01); *B33Y 30/00* (2014.12)

(58) Field of Classification Search
CPC .............. B29C 67/0085; B29C 67/005; B29C 67/0059; B33Y 30/00; B41J 2202/14; B41J 2202/20; B41J 2202/19

USPC ........................................................ 425/375
See application file for complete search history.

(56) References Cited

U.S. PATENT DOCUMENTS 8,153,182 B2 * 4/2012 Comb et al. ....................... 427/8
8,419,996 B2 4/2013 Swanson et al.
(Continued)

FOREIGN PATENT DOCUMENTS

CN 101574864 8/2012
JP 2006281753 * 10/2006
(Continued)

OTHER PUBLICATIONS

"Office Action of Taiwan Counterpart Application", issued on Oct. 17, 2014, p. 1-p. 5.

*Primary Examiner* — Alison Hindenlang
*Assistant Examiner* — Jerzi H Moreno Hernandez
(74) *Attorney, Agent, or Firm* — Jianq Chyun IP Office

(57) ABSTRACT

A printing head module includes a bracket, a locking mechanism disposed on the bracket and a printing head. The bracket includes a containing cavity and a supporter. The locking mechanism includes a pressing component fixed to the supporter, a locking component and an elastic component. The locking component pivoted to the pressing component such that the elastic component leans therebetween. The locking component has a first positioning portion. The printing head detachably disposed in the containing cavity includes a second positioning component. The first positioning portion is engaged with the second positioning component, so the elastic component is pressed to provide the locking component a restoring force away from the pressing component to confine the printing head between the locking component and the bracket.

11 Claims, 7 Drawing Sheets

(56) References Cited

U.S. PATENT DOCUMENTS

| | | |
|---|---|---|
| 8,465,111 B2 | 6/2013 | Swanson et al. |
| 8,890,914 B1 * | 11/2014 | Chang .......................... 347/197 |
| 2005/0276645 A1 * | 12/2005 | Hirte et al. ...................... 400/59 |
| 2012/0019592 A1 * | 1/2012 | Chang ............................. 347/37 |
| 2012/0161350 A1 | 6/2012 | Swanson et al. |
| 2012/0162305 A1 | 6/2012 | Swanson et al. |
| 2012/0162314 A1 | 6/2012 | Swanson et al. |
| 2012/0164256 A1 | 6/2012 | Swanson et al. |
| 2012/0164330 A1 | 6/2012 | Swanson et al. |
| 2015/0165676 A1 * | 6/2015 | Chen et al. .......... B29C 67/0059 425/170 |

FOREIGN PATENT DOCUMENTS

| | | |
|---|---|---|
| TW | I233889 | 6/2005 |
| TW | 201236883 | 9/2012 |

* cited by examiner

PRINTING HEAD MODULE

CROSS-REFERENCE TO RELATED APPLICATION

This application claims the priority benefit of Taiwan application serial no. 103100420, filed on Jan. 6, 2014. The entirety of the above-mentioned patent application is hereby incorporated by reference herein and made a part of this specification.

BACKGROUND OF THE INVENTION

1. Technical Field

The technical field relates to a printing head module, and more particularly to a detachable printing head module.

2. Description of Related Art

Along with advances in computer-aided manufacturing (CAM), the manufacturing industry has developed the technology of three-dimensional (3-D) printing, thereby rapidly fabricating products from an original design concept. In fact, the 3-D printing technology is a collective term referring to a series of rapid prototyping (RP) techniques, and the basic principle is laminate manufacture, wherein a rapid prototyping machine is used to form cross-sectional shapes of a workpiece in the X-Y plane through scanning, shift intermittently at a layer thickness in the Z coordinates, and ultimately form 3-D objects. The 3-D printing technology is applicable regardless of the geometric shapes and the RP technology produces excellent outputs in particular for complex parts, which saves efforts and processing time significantly. The 3-D printing technology is capable of presenting an object of a digital 3-D model designed by means of computer-aided design (CAD) software in the least time for the user to touch and actually feel the geometry of the model, or even to test the assemblability of the parts and possible functions.

However, in the current 3-D printing apparatuses that utilize the aforementioned rapid prototyping technology, a printing head is generally directly fixedly disposed on a bracket that is adapted to slide along a sliding rail, thus enabling the printing head to slide back and forth along the sliding rail so as to spray a hot-melt material onto a base of the 3-D printing apparatuses. With such arrangement, since the printing head is fixedly disposed on the slidable bracket, the printing head is relatively difficult or even impossible to be independently detached. Accordingly, cleaning, replacement or maintenance of the printing head is difficult. Therefore, current 3-D printing equipments are still very inconvenient in terms of maintenance and also take a lot of manpower.

SUMMARY

The present disclosure is directed to a printing head module, wherein the printing head thereof can be detached from and assembled to a bracket easily.

One of exemplary embodiments provides a printing head module configured to forming a three-dimensional (3-D) object layer by layer with a modeling material on a carrying surface of a base. The printing head module includes a bracket, a locking mechanism and a printing head. The bracket includes a containing cavity and a supporter. The locking mechanism is disposed on the bracket and includes a pressing component, a locking component and an elastic component. The pressing component is fixed above the containing cavity. The locking component is pivotally connected to the pressing component, such that the elastic component leans between the pressing component and the locking component. The locking component has at least a first positioning portion and a first material inlet, and the pressing component has a second material inlet corresponding to the first material inlet for feeding the modeling material. The printing head detachably disposed in the containing cavity and includes at least a second positioning portion configured to be engaged with the first positioning portion. The elastic component is pressed to provide the locking component with a restoring force away from the pressing component, so as to confine the printing head between the locking component and the bracket.

Based on the aforementioned description, the printing head module of the disclosure utilizes the structural engagement between the locking mechanism disposed on the bracket and the positioning portion of the printing head, so the locking mechanism can be engaged with the positioning portion of the printing head when the printing head is disposed in the containing cavity of the bracket, such that the printing head is fixed to the bracket and can be easily detached therefrom. Thereby, the printing head module of the disclosure can be easily detached from and assembled to the bracket during cleaning, replacing and maintaining processes, so as to improve the convenience of the printing head module in use and maintenance.

To make the above features and advantages of the disclosure more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
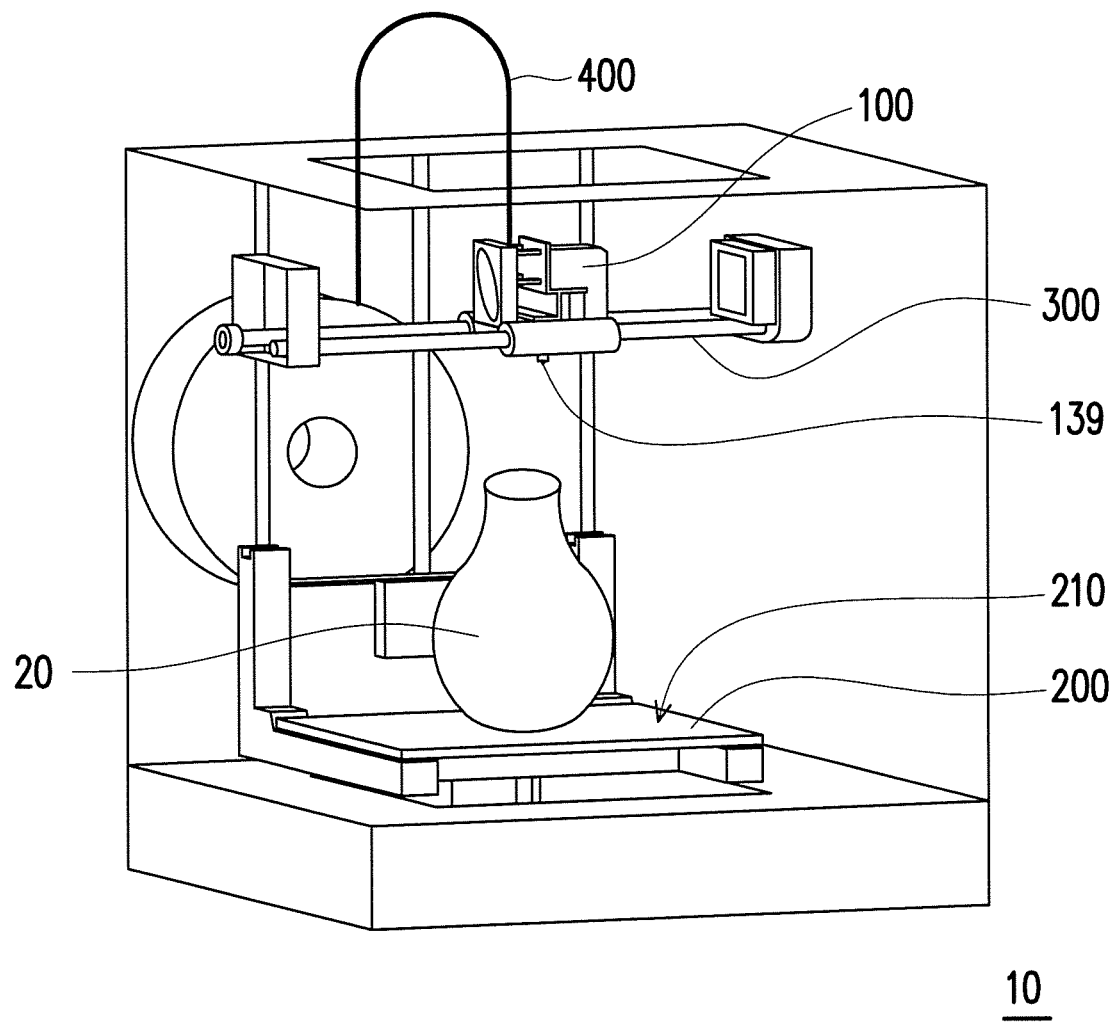
FIG. 1 is a schematic view of a printing head module applied to a three-dimensional printing apparatus according to an exemplary embodiment.

It is to be understood that both of the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the exemplary embodiments. The present embodiment is approximately identical to the second embodiment, and same or similar reference numerals used in the present embodiment and in the second embodiment represent the same or similar elements.

FIG. 1 is a schematic view of a printing head module applied to a three-dimensional printing apparatus according to an exemplary embodiment. Referring to FIG. 1, the printing head module 100 of the present embodiment is applicable to a three-dimensional (3-D) printing apparatus 10. The 3-D printing apparatus 10 is configured to print a 3-D object 20 according to, for example, a digital 3-D model. The 3-D printing apparatus 10 may include the printing head module 100 of the present embodiment, a base 200 and a sliding rail 300. The printing head module 100 is configured to form the 3-D object 20 layer by layer with a modeling material on the base 200. The base 200 shown in FIG. 1 has a carrying surface 210 for carrying the modeling material provided by the printing head module 100. The modeling material may be, for example, a solid filament 400 composed of hot melt material as shown in FIG. 1 which can be transmitted to the nozzle 139. The sliding rail 300 is disposed above the base 200. In the present embodiment, an extensional direction of the sliding rail 300 is parallel to the carrying surface 210. The printing head module 100 is configured to slide back and forth along the sliding rail 300, and the base 200 may move, for example, in parallel with and relatively to the printing head module 100.

In detail, the 3-D printing apparatus 10 may further include a control unit coupled to the printing head module 100 and configured to read and process the digital 3-D model. The digital 3-D model may be a digital 3-D image file, which is built by a computer host through software such as computer-aided design (CAD), animation modeling software, etc. The control unit may control the printing head module 100 to move along the sliding rail 300 according to the digital 3-D model, and the printing head module 100 dispenses the modeling material on the carrying surface 210 by layers while moving, so as to form the 3-D object 20.

Figure 2:
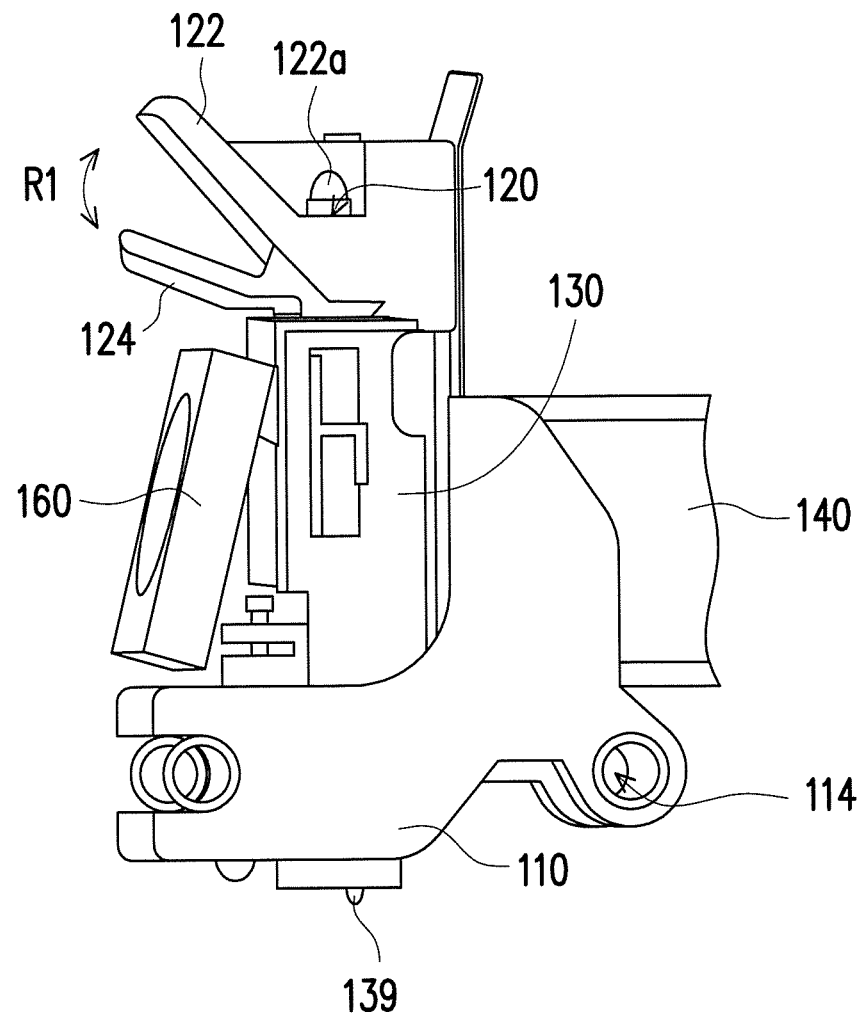
FIG. 2 is a side view of a printing head module according to an exemplary embodiment.
Figure 3:
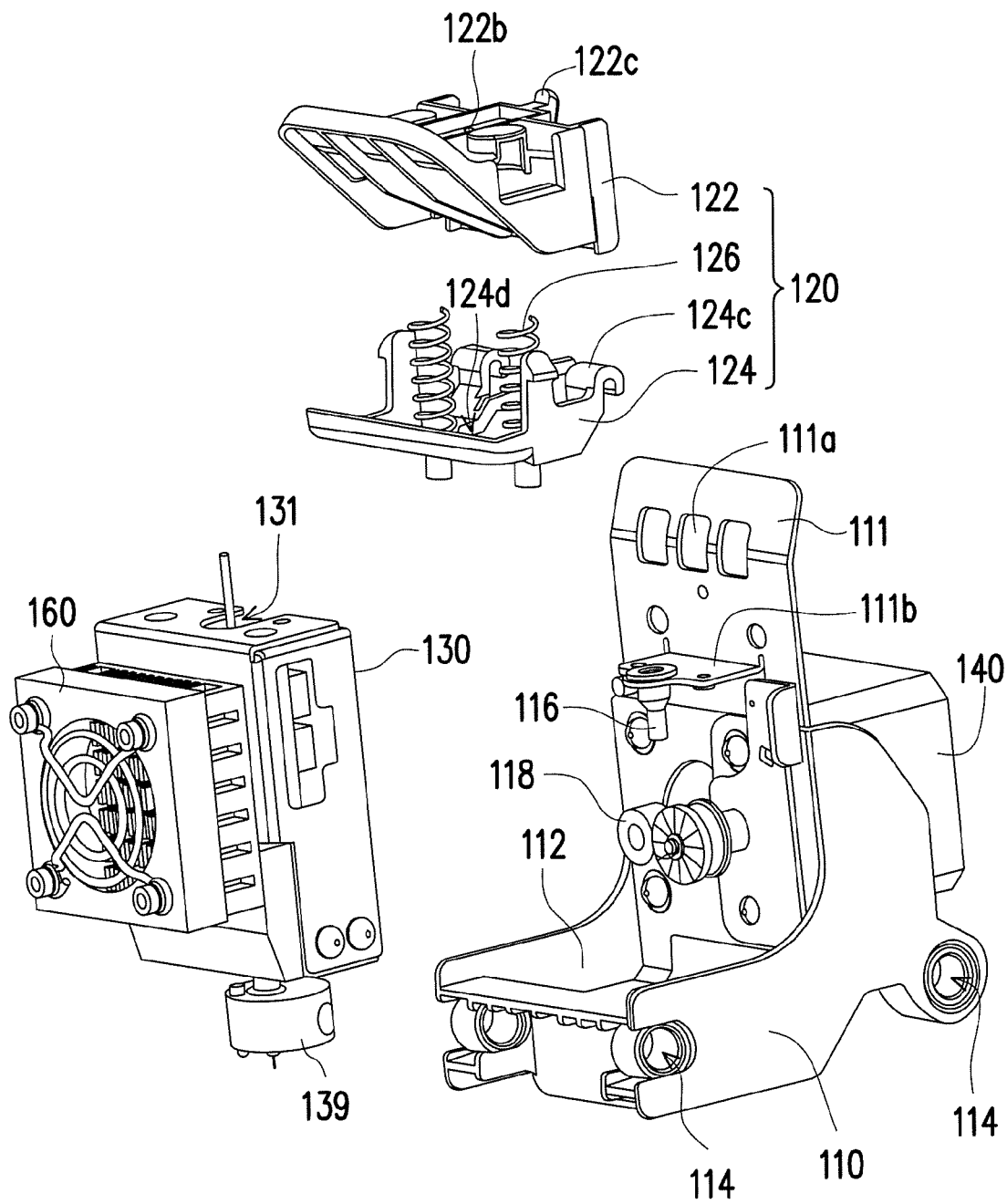
FIG. 3 is an exploded view of a printing head module according to an exemplary embodiment.

FIG. 2 is a side view of a printing head module according to an exemplary embodiment. FIG. 3 is an exploded view of a printing head module according to an exemplary embodiment. Referring to FIG. 2 and FIG. 3, in the present embodiment, the printing head module 100 includes a bracket 110, a locking mechanism 120 and a printing head 130. The bracket 110 includes a containing cavity 112 and a supporter 111, and the bracket 110 is slidably disposed on the sliding rail 300 as shown in FIG. 1. In the present embodiment, the bottom part of the bracket 110 includes a plurality of through holes 114 for the sliding rail 300 to penetrate therethrough. Namely, the sliding rail 300 passes through the through holes 114 so that the bracket 110 is capable of sliding back and forth along the sliding rail 300. In the present embodiment, the printing head module 100 further includes a motor 140 coupled to the bracket 110 for driving the bracket 110 to slide along the sliding rail 300. In the present embodiment, the control unit of the 3-D printing apparatus 10 may control the motor 140 according to the digital 3-D model for driving the bracket 110 to slide along the sliding rail 300, so as to control the movement of the printing head module 100 as a whole.

In addition, the printing head 130 is detachably disposed in the containing cavity 112 through the locking mechanism 120, wherein the locking mechanism 120 is disposed on the bracket 110 and includes a pressing component 122, a locking component 124 and an elastic component 126. The pressing component 122 is fixed at the supporter 111 and located above the containing cavity 112. In this embodiment, the supporter 111 includes a locking hole 111a and a fixing portion 111b. The pressing component 122 includes a second hook 122c passing through the locking hole 111a to be engaged therewith, such that the pressing component 122 is fixed to the supporter 111. The locking component 124 is pivotally connected to the pressing component 122 to rotate relatively to the pressing component 122 along a rotating direction R1. To be specific, the locking component 124 may further include a pivot element 124c sleeved on a rotating axis of the pressing component 122 as shown in FIG. 3, such that the locking component 124 is capable of rotating relatively to the pressing component 122 along the rotating direction R1. The elastic component 126 leans between the pressing component 122 and the locking component 124. The printing head 130 is detachably disposed in the containing cavity 112.

Figure 4:
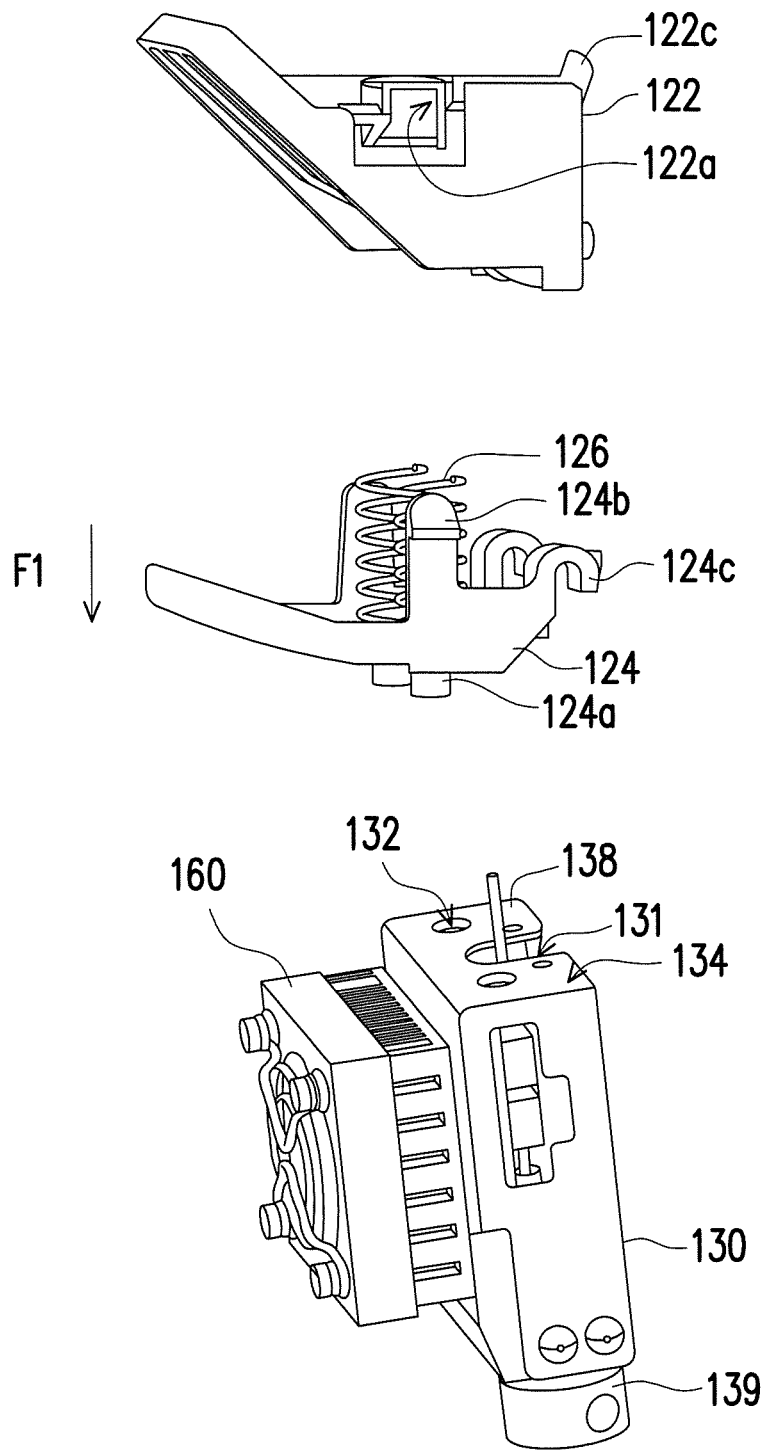
FIG. 4 is a partial exploded view of a printing head module according to an exemplary embodiment.

FIG. 4 is a partial exploded view of a printing head module according to an exemplary embodiment. Referring to FIG. 3 and FIG. 4, in detail, the locking component 124 has at least a first positioning portion 124a and a first material inlet 124d. The pressing component 122 has a second material inlet 122b corresponding to and communicating with the first material inlet 124d, such that the modeling material can pass through the first material inlet 124d and the second material inlet 122b to be fed into the printing head 130. The printing head 130 includes at least a second positioning portion 132 corresponding to the first positioning portion 124a and a third material inlet 131 located on a top surface of the printing head 130. The third material inlet 131 corresponds to the first material inlet 124d and the second material inlet 122b, such that the modeling material can pass through the material inlets 124d, 124d and 131 sequentially to be fed into the printing head 130 smoothly. When tending to dispose the printing head 130 in the containing cavity 112, the user may lift up the locking component 124 so locking component 124 is rotated toward the pressing component 122. At the time, the elastic component 126 disposed between the pressing component 122 and the locking component 124 is pressed to provide the locking component 124 with a restoring force F1 away form the pressing component 122. After disposing the printing head 130 in the containing cavity 112, the user may release the locking component 124. At the time, the locking component 124 bears the restoring force F1 provided by the elastic component 126 so as to return back to the original position. Thereby, the first positioning portion 124a of the locking component 124 are engaged with the second positioning portion 132 of the printing head 130 to confine the printing head 130 between the locking component 124 and the bracket 110.

Similarly, when tending to detach the printing head 130 from the bracket 110, the user may lift up the locking component 124 again, so the locking component 124 is rotated toward the pressing component 122, which enables the first positioning portion 124a to be disengaged from the second positioning portion 132, so as to release the structural interference between the printing head 132 and the bracket 110. Thereby, the user may easily detach the printing head 130 from the bracket 110.

In the present embodiment, the first positioning portion 124a may be a protrusion facing the containing cavity 112. The second positioning portion 132 may be a concave, which is disposed on a top surface 134 of the printing head 132 and suitable for being engaged with the protrusion. In addition, the printing head 130 further includes a casing 138 as shown in FIG. 4. The second positioning portion 132 and the third material inlet 131 are disposed on the top surface 134 of the casing 138. In detail, the pressing component 122 further includes at least a positioning hole 122a. The locking component 124 further includes at least a first hook 124b. The first hook 124b passes through the positioning hole 122a and is structurally interfered with the positioning hole 122a, such that the pressing component 122 and the locking component 124 are connected with each other.

With the aforementioned disposition, when the printing head 130 is disposed in the containing cavity 112, the first positioning portion 124a of the locking component 124 is engaged with the second positioning portion 132 of the printing head 130, so as to fix the printing head 130 onto the bracket 110. When tending to detach the printing head 130 from the bracket 110, the user merely has to lift the locking component 124 toward the pressing component 122, the first positioning portion 124a is then separated from the second positioning portion 132 so as to release the structural interference between the printing head 130 and the bracket 110, and the printing head 130 can be detached from the bracket 110 by the user.

Figure 5:
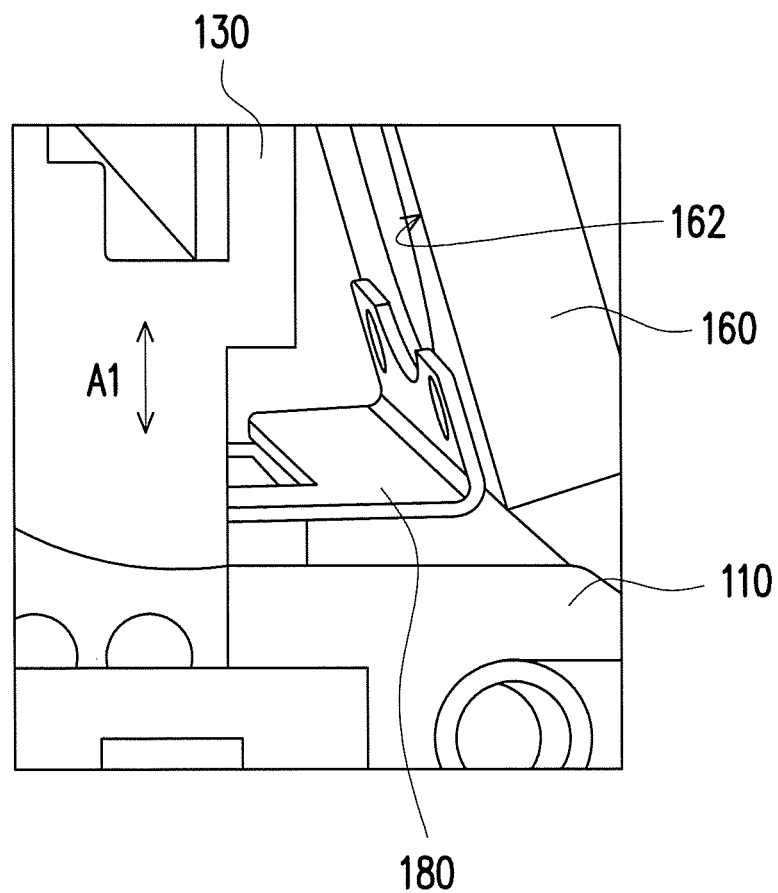
FIG. 5 is a partial enlarged view of a printing head module according to an exemplary embodiment.
Figure 6:
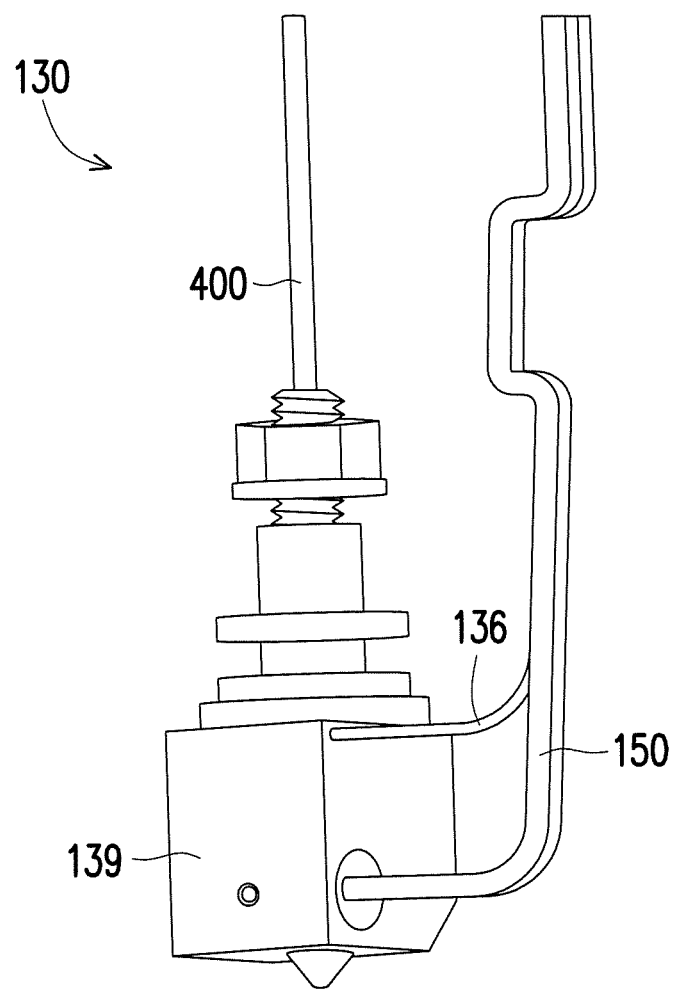
FIG. 6 is a partial view of a printing head module according to an exemplary embodiment.

FIG. 5 is a partial enlarged view of a printing head module according to an exemplary embodiment. FIG. 6 is a partial view of a printing head module according to an exemplary embodiment. Referring to FIG. 5 and FIG. 6, in the present embodiment, the printing head 130 further includes a nozzle 139. The bracket 110 further includes a material feed pipe 116 and a material feed module 118. The material feed module 118 is located between material feed pipe 116 and the nozzle 139 for transmitting the modeling material to the nozzle 139. The material feed pipe 116 is disposed on the fixing portion 111b of the supporter 111, and corresponds to the material inlets 122b, 124d, 131 and the nozzle 139. When the printing head 130 is disposed in the containing cavity 112, the location of the nozzle 139 corresponds to the location of the material feed pipe 116, so the modeling material can be transmitted to the nozzle via the material feed pipe 116 by the material feed module 118. In addition, the printing head module 100 may further include a heating unit 150. The modeling material may be a hot melt material which is in the form of the solid filament 400 as shown in FIG. 6. The modeling material can be transmitted to the nozzle 139 via the material feed pipe 116 as shown in FIG. 3. The heating unit 150 is configured to heat the modeling material transmitted to the nozzle 139, such that the modeling material is transformed into a molten modeling material in molten state to be extruded from the printing head 130 onto the carrying surface 122 by layers, so as to form the 3-D object 20 shown in FIG. 1 composed of a plurality of modeling material layers stacked over each other. In the present embodiment, the modeling material may be, for example, Polylactic Acid (PLA), Acrylonitrile Butadiene Styrene (ABS) or other hot melt polymers.

In the present embodiment, the printing head module 100 may further includes a fan 160 disposed on the printing head 130 as shown in FIG. 3. An air-outlet surface of the fan 160 faces the material feed pipe 116 and the air-outlet surface may be, for example, parallel to the longitudinal direction of the material feed pipe 116. In addition, in other embodiment, the printing head module 100 may further includes a leaning component 180 leaning between the fan 160 and the printing head 130 as shown in FIG. 5, such that the air-outlet surface 162 of the fan 160 and the longitudinal direction A1 of material feed pipe 116 are included an acute angle as shown in FIG. 2 and FIG. 5. Thereby, the cooling air provided by the fan 160 is transmitted toward the nozzle 139 to keep the temperature of the nozzle 139 from being too high which soften or melt the modeling material too quickly.

Additionally, the printing head 130 may further includes a temperature sensing unit 139 coupled to the nozzle 139 for sensing the temperature of the nozzle 139. In the present embodiment, the control unit of the 3-D printing apparatus 10 may obtain the temperature of the nozzle 139 through the temperature sensing unit 136, so as to control the temperature of the nozzle 139 within a specific range accordingly. It should be mentioned that the temperature of the nozzle 139 may be controlled to be substantially higher than the melting point of the modeling material, so the modeling material can be melted into molten modeling material.

Figure 7:
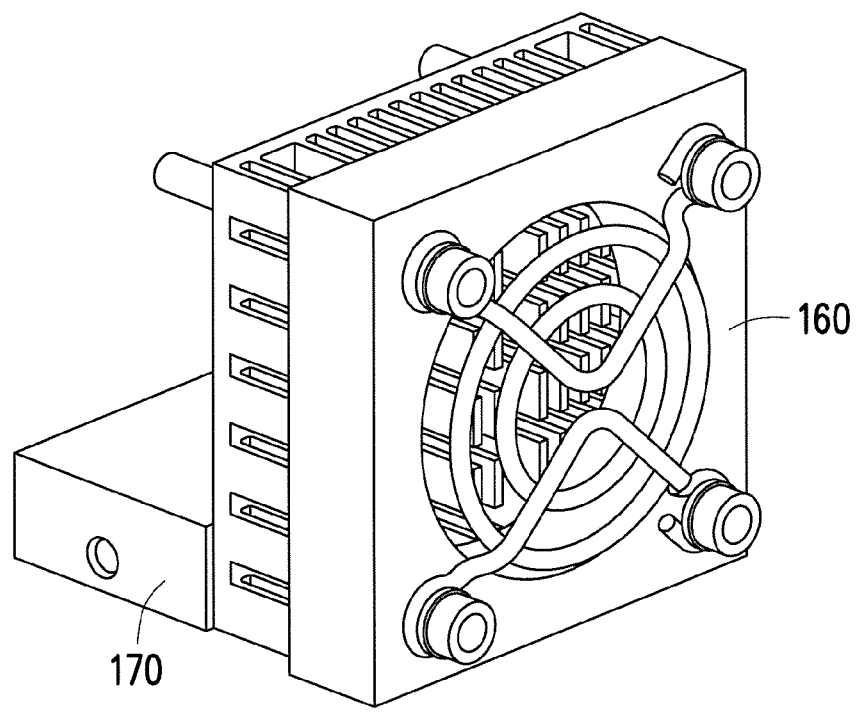
FIG. 7 is a schematic view of a fan and a heat dissipation block of a printing head module according to an exemplary embodiment.
Figure 8:
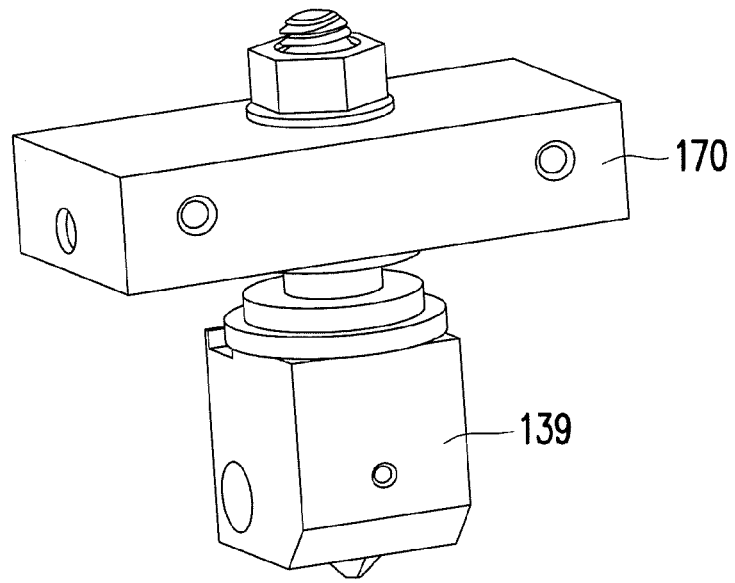
FIG. 8 is a schematic view of a printing head and a heat dissipation block of a printing head module according to an exemplary embodiment.

FIG. 7 is a schematic view of a fan and a heat dissipation block of a printing head module according to an exemplary embodiment. FIG. 8 is a schematic view of a printing head and a heat dissipation block of a printing head module according to an exemplary embodiment. Referring to FIG. 7 and FIG. 8, in the present embodiment, besides the aforementioned disposition, the printing head module 100 may further includes a heat dissipation block 170 for performing heat dissipation to the material feed pipe 138 additionally. The heat dissipation block 170 is connected to the fan 160 so the cooling air provided by the fan 160 may be transmitted to the heat dissipation block 170 to help the heat dissipation block with heat dissipation. In the present embodiment, the fan 160 has a plurality of rivets as shown in FIG. 7, which are engaged with the casing 138 of the printing head 130 and the heat dissipation block 170 respectively, so as to fix the connecting relationship between the printing head 130, the heat dissipation block 170 and the fan 160.

In sum, the printing head module of the disclosure utilizes the structural engagement between the locking mechanism on the bracket and the positioning portion of the printing head, so the locking mechanism can be engaged with the positioning portion of the printing head when the printing head is disposed in the containing cavity of the bracket, such that the printing head is fixed to the bracket and can be easily detached therefrom. In this way, the printing head module of the disclosure make it possible to detach and assemble the printing head thereof for cleaning, replacement or maintenance of the same, which further increases the convenience in use and maintenance of the printing head module.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A printing head module, configured to Rum a three-dimensional object layer by layer with a modeling material on a carrying surface of a base, the printing head module comprising:
   a bracket including a containing cavity and a supporter;
   a locking mechanism disposed on the bracket, wherein the locking mechanism comprises a pressing component, a locking component and an elastic component, the pressing component is fixed to the supporter, the locking component is pivotally connected to the pressing component, such that the elastic component leans between the pressing component and the locking component, the locking component has at least one first positioning portion and a first material inlet, and the pressing component has a second material inlet corresponding to the first material inlet for feeding the modeling material; and
   a printing head detachably disposed in the containing cavity, wherein the printing head comprises at least a second positioning portion, configured to be engaged with the first positioning portion, such that the elastic component is pressed to provide the locking component with a restoring force away from the pressing component to confine the printing head between the locking component and the bracket.

2. The printing head module as claimed in claim 1, wherein the first positioning portion comprises a protrusion facing the containing cavity, and the second positioning portion comprises a concave correspondingly disposed on a top surface of the printing head.

3. The printing head module as claimed in claim 1, wherein the pressing component further comprises at least an opening, the locking component further comprises at least a hook, the hook passes through and is engaged with the opening, such that the pressing component and the locking component are connected to each other.

4. The printing head module as claimed in claim 1, wherein the printing head further comprises a nozzle, and the bracket further comprises a material feed pipe corresponding to the nozzle, so as to transmit the modeling material to the nozzle through the material feed pipe.

5. The printing head module as claimed in claim 4, wherein the modeling material is a hot melt material, and the printing head module further comprises:
 a heating unit coupled to the printing head and configured to heat the modeling material in the nozzle, so as to melt the modeling material to a molten material, and the molten modeling material is extruded from the nozzle.

6. The printing head module as claimed in claim 5, further comprising a fan disposed on the printing head, wherein an air-outlet surface of the fan faces the material feed pipe.

7. The printing head module as claimed in claim 6, further comprising a leaning component disposed between the fan and the printing head, such that an acute angle is included between the air-outlet surface and a longitudinal direction of the material feed pipe.

8. The printing head module as claimed in claim 6, further comprising a heat dissipation block connected to the fan.

9. The printing head module as claimed in claim 1, wherein the bracket further comprises a plurality of through holes, and a sliding rail passes through the through holes, such that the bracket is capable of sliding along the sliding rail.

10. The printing head module as claimed in claim 9, further comprising a motor coupled to the bracket, so as to drive the bracket to slide along the sliding rail.

11. The printing head module as claimed in claim 1, wherein the printing head further comprises a third material inlet located on a top surface of the printing head, and the third material inlet corresponds to the first material inlet and the second material inlet.

* * * * *